United States Patent
Chang et al.

(10) Patent No.: US 6,788,367 B2
(45) Date of Patent: Sep. 7, 2004

(54) LIQUID CRYSTAL DISPLAY DEVICE

(75) Inventors: Shih-Chang Chang, Hsinchu (TW); Yaw-Ming Tsai, Taichung (TW)

(73) Assignee: Toppoly Optoelectronics Corp. (TW)

( * ) Notice: Subject to any disclaimer, the term of this patent is extended or adjusted under 35 U.S.C. 154(b) by 0 days.

(21) Appl. No.: 10/347,410

(22) Filed: Jan. 21, 2003

(65) Prior Publication Data

US 2004/0141118 A1 Jul. 22, 2004

(51) Int. Cl.$^7$ ............................................. G02I 1/1335
(52) U.S. Cl. .................................... 349/114; 349/106
(58) Field of Search .............................. 349/113, 106, 349/114, 138

(56) References Cited

U.S. PATENT DOCUMENTS

| | | | |
|---|---|---|---|
| 5,943,107 A | * 8/1999 | Kadota et al. | 349/44 |
| 6,501,521 B2 | * 12/2002 | Matsushita et al. | 349/106 |
| 6,621,543 B2 | * 9/2003 | Moon | 349/115 |
| 6,633,353 B1 | * 10/2003 | Seki et al. | 349/113 |

* cited by examiner

Primary Examiner—Toan Ton
(74) Attorney, Agent, or Firm—Lowe Hauptman Gilman & Berner, LLP

(57) ABSTRACT

This invention relates to a liquid crystal display (LCD) device having the best performance of contrast ratio and color saturation in the transmissive and reflective areas of color LCD by adjusting the thicknesses of two color filters on the lower and upper transparent substrates. The present invention includes a first substrate having a reflective area and a transmissive area, and a plurality of thin film transistors (TFTs) thereon; a dielectric layer on said first substrate; a first color filter on said dielectric layer; an elevated dielectric layer on said first color filter in said reflective area; a first electrode on said elevated dielectric layer in said reflective area and on said first color filter in said transmissive area, wherein the top surface of said first electrode in said reflective area is higher than the top surface of said first electrode in said transmissive area; a liquid crystal layer on said first electrode; a second electrode on said liquid crystal layer; a second color filter on said second electrode; and a second substrate on said second color filter.

41 Claims, 4 Drawing Sheets

LIQUID CRYSTAL DISPLAY DEVICE

BACKGROUND OF THE INVENTION

1. Field of the Invention

The invention is relates to a liquid crystal display (LCD) device, more particularly to a liquid crystal display device having the best performance of contrast ratio and color saturation in the transmissive and reflective areas of color LCD by adjusting the thicknesses of two color filters on the lower and upper transparent substrates.

2. Description of the Prior Art

A color LCD [liquid crystal display] panel comprises two transparent substrates and a liquid crystal layer between the substrates. In general, a color filter is only placed on the transparent substrate opposite to TFTs (thin film transistors). It means that the color filter and TFTs are placed on different transparent substrates respectively opposite to each other.

For the transmissive-type or reflective-type color LCD, the presented color saturation is identical because the distance for light rays passing through a color filter in the whole liquid crystal panel is the same. But for the transflective-type color LCD, please refer to FIG. 1, when external light rays are sufficient to display figures or pictures on the screen, the color LCD will use external light rays 111 as the light source according to the reflection theory. So light rays pass through the color filter 13 twice in the reflective area 11, which will present the higher color saturation. When external light rays are insufficient to display figures or pictures on the screen, the color LCD will use its back light (BL) source according to the transmissive theory. Then the light rays 121 pass through the color filter 13 once in the transmissive area 12, which will present the lower color saturation in comparison to the reflective area 11.

Because of the above reasons, when the transflective-type color LCD uses both of the transmissive and reflective display modes at the same time, the problem of different color saturation is produced. The methods that have been practically used in the industry are illustrated in FIG. 2A and FIG. 2B. A method that the color filter in the reflective area 21 is thinner than the color filter in the transmissive area 22 is adopted. The reflective area 21 is in the left side of FIG. 2A and the transmissive area 22 is in the right side of FIG. 2A. If external light rays 211, as the light source, are sufficient to display figures and pictures on the screen, the light rays 211 of the reflective area 21 will pass through the color filter 212 and be reflected by the reflective electrode on the elevated reflective layer 213. Because of elevated reflective layer 213 with the bumps, many reflective light rays 214 will be produced according to the scattering theory to pass through the liquid crystal layer 23 and the color filter 212 to display figures and pictures on the screen. But when external light rays are insufficient to display figures and pictures on the screen, the LCD will use its BL 221 to pass through the liquid crystal layer 23 and the color filter 222. Owing to the thickness t of color filter 212 be less than the thickness T of color filter 222, it will generate the similar substantially color saturation in both of the reflective and transmissive areas under the thickness compensation theory.

Another method for making many hollow holes in the color filter at the reflective area is adopted in FIG. 2B. The reflective area 26 is in the left side of FIG. 2B and the transmissive area 27 is in the right side of FIG. 2B. When external light rays 261 are sufficient to display figures and pictures on the screen, the LCD will use external light rays 261 as the light source. Therefore, the light rays 261 of the reflective area 26 will pass through the color filter 262 and be reflected by the reflective electrode on the elevated reflective layer 263. Because of elevated reflective layer 263 with the bumps, many reflective light rays 264 will be produced according to the scattering theory to pass through the liquid crystal layer 28 and the color filter 262 to display figures and pictures on the screen. But when external light rays are insufficient, the LCD will use its BL 271, passing through the liquid crystal layer 28 and the color filter 272, to display figures and pictures on the screen. There are many small holes in the color filter 262 and there is not any small hole in the color filter 272. It will generate the similar substantially color saturation in both of the reflective and transmissive areas by using the small holes in the color filter of reflective area.

It still exists the problem for aligning two glass substrates either using the method that the color filter in the reflective area is thinner than the color filter in the transmissive area or the method for making many hollow holes in the color filter at the reflective area. Especially due to the present LCD have quite small pixel; it is very difficult to align the reflective and transmissive areas of two glass substrates. The problem of different color saturation in the reflective and transmissive areas will be produced while there is a little deviation on the alignment.

SUMMARY OF THE INVENTION

In the light of the state of the art described above, it is an object of the present invention to provide a liquid crystal display (LCD) device with two color filters on the lower and upper transparent substrates which is immune to the problems of the conventional LCD device described above.

It is another object of this invention to provide a liquid crystal display device with two color filters on the lower and upper transparent substrates to present the same color saturation in the reflective and transmissive areas.

It is a further object of this invention to provide a liquid crystal display device with two color filters on the lower and upper transparent substrates to overcome the problem for disaligning the reflective and transmissive areas on the lower and upper transparent substrates.

In view of the above and other objects which will become apparent as the description proceeds, there is provided according to a general aspect of the present invention a liquid crystal display device which includes a general aspect of the present invention a liquid crystal display device which includes a first substrate having a reflective area and a transmissive area, and a plurality or thin film transistors (TFTs) thereon; a dielectric layer on said first substrate; a first color filter on said dielectric layer; an elevated dielectric layer on said first color filter in said reflective area; a first electrode on said elevated dielectric layer in said reflective area and on said first color filter in said transmissive area, wherein the top surface of said first electrode in said reflective area is higher than the top surface of said first electrode in said transmissive area; a liquid crystal layer on said first electrode; a second electrode on said liquid crystal layer; a second color filter on said second electrode; and a second substrate on said second color filter.

Base on the idea described above, wherein said first and second substrates are transparent.

Base on the aforementioned idea, wherein the material of said dielectric layer is selected from the group consisting of $SiO_2$, $Si_3N_4$ and both.

Base on the idea described above, the material of said elevated dielectric layer is photopolymer.

Base on the aforementioned idea, wherein the thickness of said elevated dielectric layer is about 1~3 µm.

Base on the idea described above, wherein said first and second color filters comprise three non-overlapping color areas.

Base on the aforementioned idea, wherein said three color areas are red, green and blue.

Base on the idea described above, wherein the colors of identical areas on said first and second color filters are same.

Base on the aforementioned idea, wherein said first electrode is coated by using the sputter method.

Base on the idea described above, wherein the height of said first electrode on said elevated dielectric layer is higher than the height of said first electrode on said first color filter in the transmissive areas.

Base on the aforementioned idea, wherein said first electrode is electrically connected with said plurality of TFTs.

Base on the idea described above, wherein the material of said first electrode on said elevated dielectric layer is selected from the group consisting of Al, Ag and AlNd alloy.

Base on the aforementioned idea, wherein the material of said first electrode on said first color filter in the transmissive areas is selected from the group consisting of ITO (indium tin oxide) and IZO (indium zinc oxide).

Base on the idea described above, wherein the best performance in the transmissive and reflective areas can be made by adjusting the thicknesses of two color filters on the lower and upper transparent substrates.

Base on the aforementioned idea, wherein the best performance in the transmissive and reflective areas is the best performance of color saturation in the transmissive and reflective areas.

In view of the above and other objects which will become apparent as the description proceeds, there is provided according to a general aspect of the present invention a liquid crystal display device which includes a first substrate having a reflective area and a transmissive area and a plurality of thin film transistors (TFTs) thereon; a dielectric layer on said first substrate; a first color filter on said dielectric layer in said transmissive area; an elevated dielectric layer on said dielectric layer in said reflective area; a reflective electrode on said elevated dielectric layer; a transmissive electrode on said first color filter, wherein the top surface of said reflective electrode is higher than the top surface of said transmissive electrode, a liquid crystal layer on said reflective electrode and on said transmissive electrode; a common electrode on said liquid crystal layer; a second color filter on said common electrode; and a second substrate on said second color filter.

Base on the idea described above, wherein said first and second substrates are transparent.

Base on the aforementioned idea, wherein the material of said dielectric layer is selected from the group consisting of $SiO_2$, $Si_3N_4$ and both.

Base on the idea described above, the material of said elevated dielectric layer is photopolymer.

Base on the aforementioned idea, wherein the thickness of said elevated dielectric layer is about 1~3 µm.

Base on the idea described above, wherein said first and second color filters comprise three non-overlapping color areas.

Base on the aforementioned idea, wherein said three color areas are red, green and blue.

Base on the idea described above, wherein the colors of identical areas on said first and second color filters are same.

Base on the aforementioned idea, wherein said reflective electrode is coated by using the sputter method.

Base on the idea described above, wherein the material of said reflective electrode on said elevated dielectric layer is selected from the group consisting of Al, Ag and AlNd alloy.

Base on the aforementioned idea, wherein said transmissive electrode is coated by using the sputter method.

Base on the idea described above, wherein the material of said transmissive electrode on said first color filter in the transmissive areas is selected from the group consisting of ITO (indium tin oxide) and IZO (indium zinc oxide).

Base on the aforementioned idea, wherein said transmissive electrode is electrically connected with said reflective electrode.

Base on the idea described above, wherein said transmissive electrode is electrically connected with said plurality of TFTs.

Base on the aforementioned idea, wherein said reflective electrode is electrically connected with said plurality of TFTs.

Base on the idea described above, wherein the best performance in the transmissive and reflective areas can be made by adjusting the thicknesses of two color filters on the lower and upper transparent substrates.

Base on the aforementioned idea, wherein the best performance in the transmissive and reflective areas is the best performance of color saturation in the transmissive and reflective areas.

In view of the above and other objects which will become apparent as the description proceeds, there is provided according to a general aspect of the present invention a liquid crystal display device which includes a first substrate having a reflective area and a transmissive area; a first color filter on said first substrate in said transmissive area; an elevated dielectric layer on said first substrate in said reflective area; a liquid crystal layer on said elevated dielectric layer in said reflective area and on said first color filter in said transmissive area; wherein the height of said liquid crystal layer in said reflective area is smaller than the height of said liquid crystal layer in said transmissive area; a second color filter on said liquid crystal layer; and a second substrate on said second color filter.

Base on the idea described above, wherein said first and second substrates are transparent.

Base on the aforementioned idea, the material of said elevated dielectric layer is photopolymer.

Base on the idea described above, wherein the thickness of said elevated dielectric layer is about 1~3 µm.

Base on the aforementioned idea, wherein said first and second color filters comprise three non-overlapping color areas.

Base on the idea described above, wherein said three color areas are red, green and blue.

Base on the aforementioned idea, wherein the colors of identical areas on said first and second color filters are same.

Base on the idea described above, wherein the best performance in the transmissive and reflective areas can be made by adjusting the thicknesses of two color filters on the lower and upper transparent substrates.

Base on the aforementioned idea, wherein the best performance in the transmissive and reflective areas is the best performance of color saturation in the transmissive and reflective areas.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
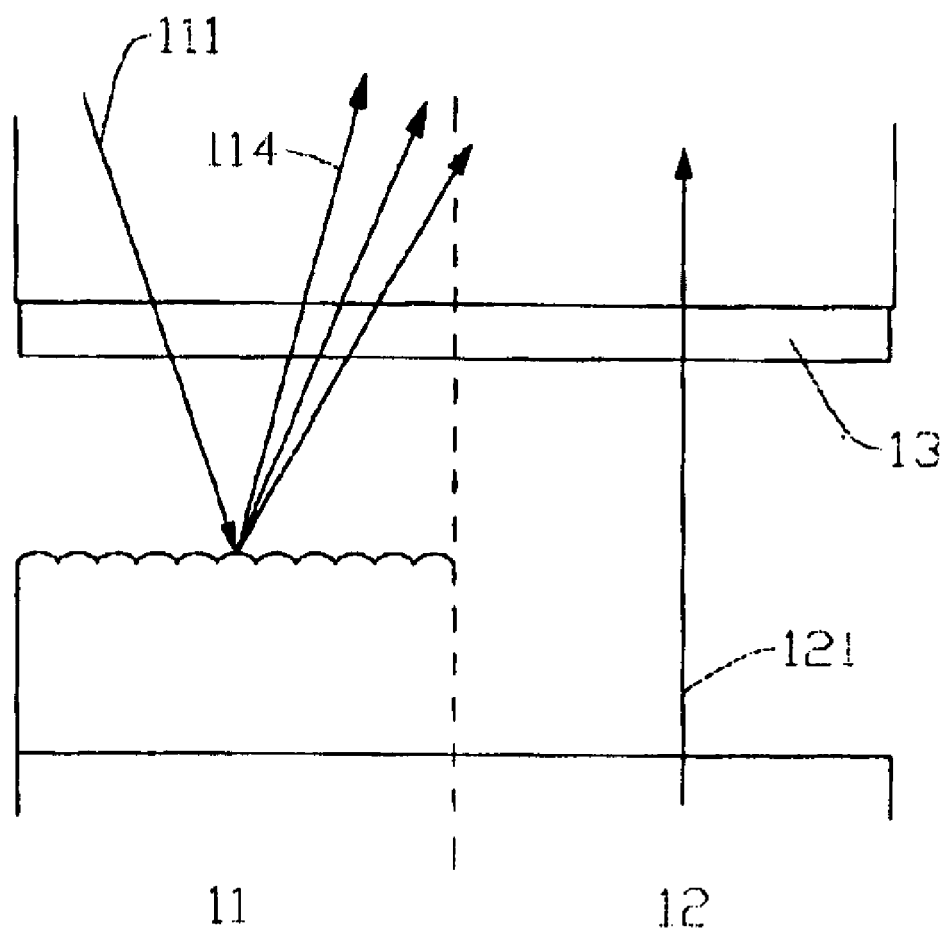
FIG. 1 illustrates a cross-section view of a conventional transflective-type color LCD.
Figure 2A:
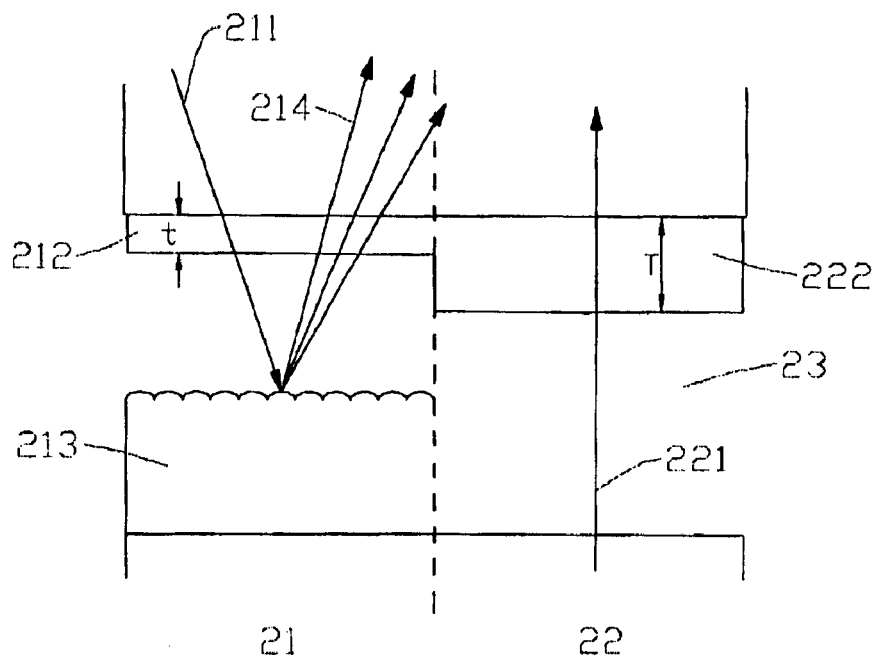
FIG. 2A illustrates a cross-section view of a conventional transflective-type color LCD by adopting the structure that the color filter in the reflective area is thinner than the color filter in the transmissive area to solve the problem of different color saturation.
Figure 2B:
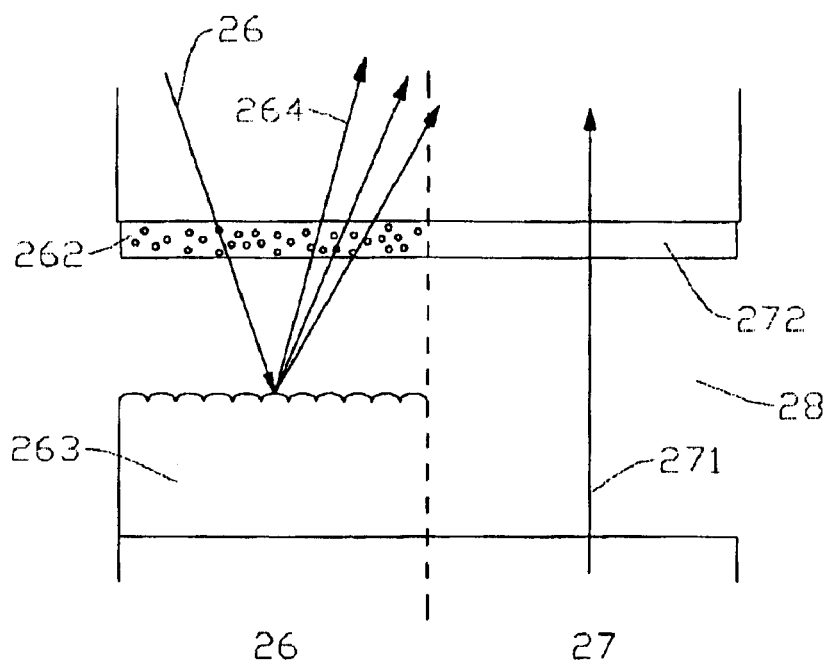
FIG. 2B illustrates a cross-section view of a conventional transflective-type color LCD by adopting the structure that makes many hollow holes in the color filter at the reflective area to solve the problem of different color saturation.
Figure 3:
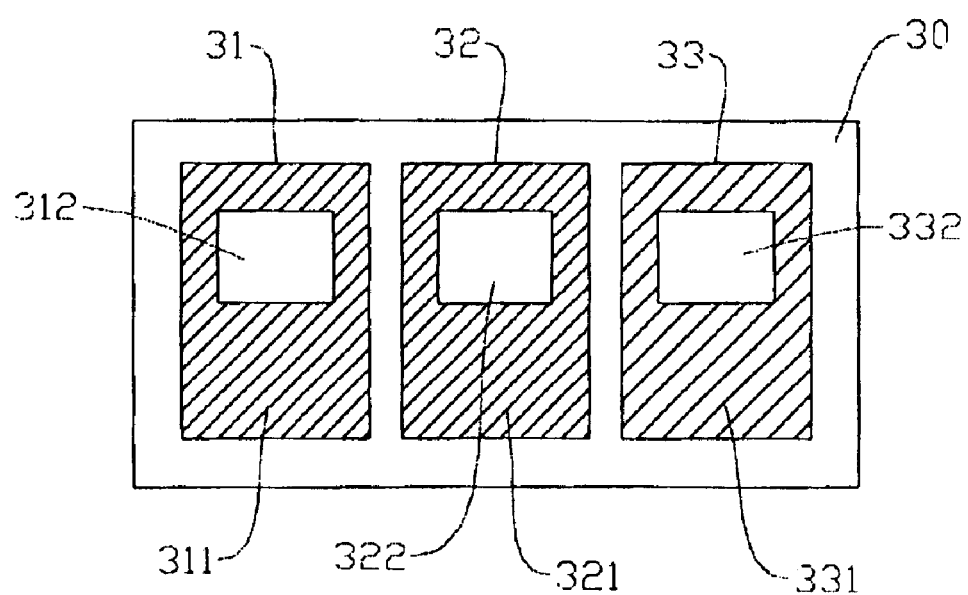
FIG. 3 illustrates a top view of single pixel according to the embodiments of this invention.
Figure 4:
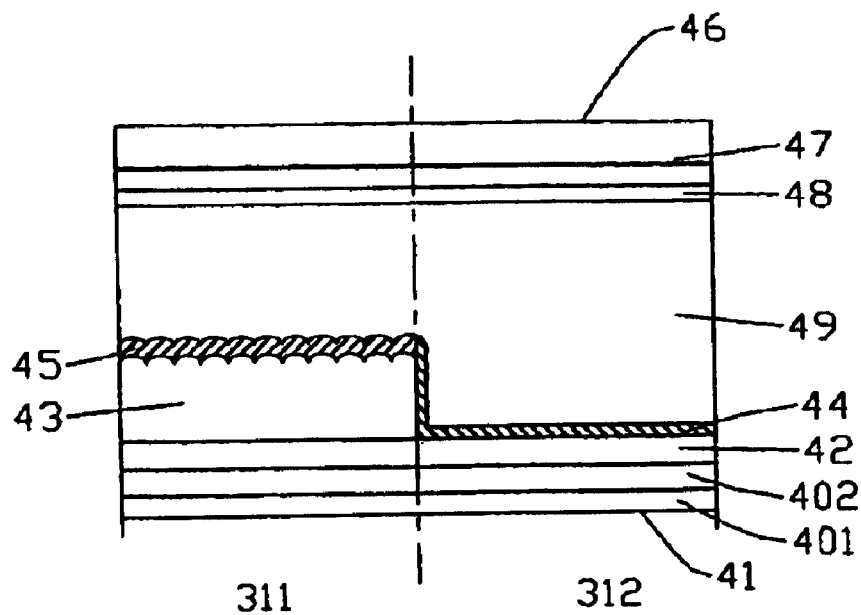
FIG. 4 illustrates a cross-section view of sub-pixel according to the first embodiment of this invention.

The first embodiment of this invention is illustrated in the top view of single pixel of FIG. 3 and in the cross-section view of the sub-pixel of FIG. 4. A single pixel 30 of the color LCD comprises three sub-pixels 31, 32, 33. The color of each sub-pixel is respectively red, green and blue color. It means if the sub-pixel 31 is the red sub-pixel, the sub-pixel 32 will be the green sub-pixel and the sub-pixel 33 will be the blue sub-pixel. As for the transflective-type LCD, each sub-pixel 31, 32, 33 can be divided into the transmissive area 312, 322, 332 and the reflective area 311, 321, 331.

FIG. 4 illustrates the cross-section view of the sub-pixel 31 comprises the transmissive area 312 and the reflective area 311. First, TFTs 401 are formed on the transparent substrate 41 and a transparent dielectric layer 402 is formed thereon subsequently. The transparent dielectric layer 402 can be a SiO$_2$ layer, a Si$_3$N$_4$ layer or a compound layer comprised of the above two materials. Then a color filter 42 having the thickness t1 is formed on each sub-pixel. The method for forming the color filter 42 is the same with the method of prior art. The color of color filter depends on the color of corresponding sub-pixel. For example, the sub-pixel 31 is red and the part of color filter 42 corresponding to the sub-pixel 31 is red. Equally, the sub-pixel 32 is green and the part of color filter 42 corresponding to the sub-pixel 32 is green. The sub-pixel 33 is blue and the part of color filter 42 corresponding to the sub-pixel 33 is blue. After the formation of the color filter 42, the transmissive area and the reflective area will be defined. The elevated reflective layer 43 with the bumps is formed at the reflective area. The material of elevated reflective layer 43 can be photopolymer or other opaque dielectric materials of which the thickness is about 1~3 μm. If photopolymer is used as the material of elevated reflective layer, it can be coated on the whole color filter 42 first and elevated reflective layer can be made by using the lithography and etching processes. After the formation of the patterns of the transmissive area and the reflective area, the transmissive electrode 44 and the reflective electrode 45 should be formed. The transmissive electrode 44 at the transmissive area 312 that comprises ITO (indium tin oxide) or IZO (indium zinc oxide) is coated by using the sputter method and the reflective electrode 45 at the reflective area 311 that comprises Al, Ag or AlNd alloy is coated by using the sputter method. The transmissive electrode 44, the reflective electrode 45 and TFTs 401 are electrically connected each other.

Then the color filter 47 having the thickness t2 is formed on another transparent substrate 46 having many sub-pixels and each sub-pixel comprises the transmissive area and the reflective area. The method for forming the color filter 47 is the same with the method of prior art. The color of color filter depends on the color of corresponding sub-pixel. A common electrode 48 is formed on the color filter 47. Finally, the two transparent substrates are sealed with the color filters 42, 47 face to face and vacuumed, and liquid crystal is injected into the space between the two transparent substrates to form the liquid crystal layer 49.

The light rays in the reflective area 311 pass through the color filter 47 twice and the light rays in the transmissive area 312 pass through the color filter 42 and the color filter 47. Therefore, we can adjust the thickness t1 of color filter 42 and the thickness t2 of color filter 47 to generate the similar or same color saturation in the reflective area and the transmissive area while the transflective-type color LCD uses both of the transmissive and reflective display modes at the same time.

Figure 5:
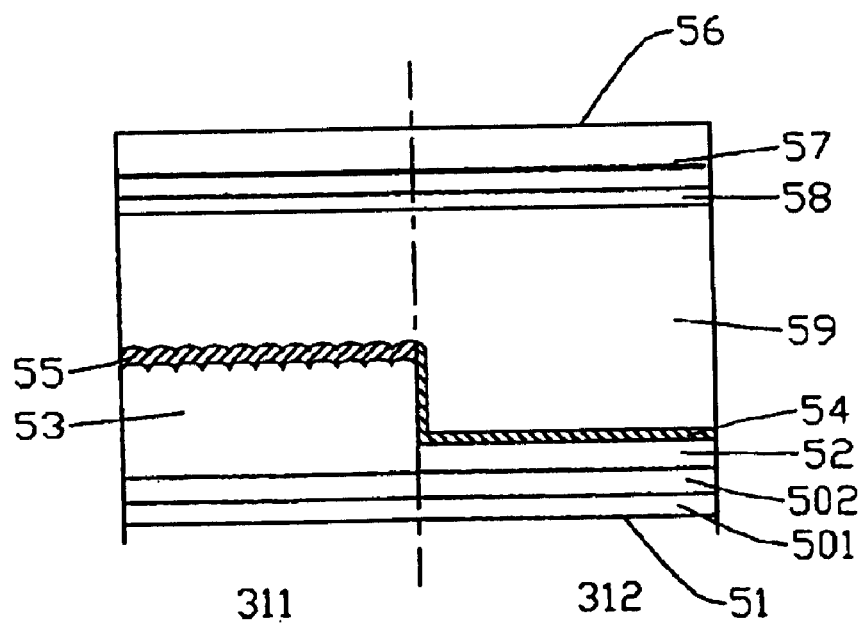
FIG. 5 illustrates a cross-section view of sub-pixel according to the second embodiment of this invention.

The second embodiment of this invention is illustrated in the top view of single pixel of FIG. 3 and in the cross-section view of the sub-pixel of FIG. 5, which illustrates the cross-section view of the sub-pixel 31 comprises the transmissive area 312 and the reflective area 311. First, TFTs 501 are formed on the transparent substrate 51 and a transparent dielectric layer 502 is formed thereon subsequently. The transparent dielectric layer 502 can be a SiO$_2$ layer, a Si$_3$N$_4$ layer or a compound layer comprised of the above two materials. Then a color filter 52 having the thickness t3 is formed on each sub-pixel. The method for forming the color filter 52 is the same with the method of prior art. The color of color filter depends on the color of corresponding sub-pixel. For example, the sub-pixel 31 is red and the part of color filter 52 corresponding to the sub-pixel 31 is red. Equally, the sub-pixel 52 is green and the part of color filter 52 corresponding to the sub-pixel 32 is green. The sub-pixel 33 is blue and the part of color filter 52 corresponding to the sub-pixel 33 is blue. It is the only difference between this and the first embodiment of FIG. 4 that there is not any the color filter 52 in the reflective area. After the formation of the color filter 52, the transmissive area and the reflective area will be defined. The elevated reflective layer 53 with the bumps is formed at the reflective area. The material of elevated reflective layer 53 can be photopolymer or other opaque dielectric materials of which the thickness is about 1~3 μm. If photopolymer is used as the material of elevated reflective layer, it can be coated on the whole color filter 52 first and elevated reflective layer can be made by using the lithography and etching processes. After the formation of the patterns of the transmissive area and the reflective area, the transmissive electrode 54 and the reflective electrode 55 should be formed. The transmissive electrode 54 at the transmissive area 312 that comprises ITO (indium tin oxide) or IZO (indium zinc oxide) is coated by using the sputter method and the reflective electrode 55 at the reflective area 311 that comprises Al, Ag or AlNd alloy is coated by using the sputter method. The transmissive electrode 54, the reflective electrode 55 and TFTs 501 are electrically connected each other.

Then the color filter 57 having the thickness t4 is formed on another transparent substrate 56 having many sub-pixels and each sub-pixel comprises the transmissive area and the reflective area. The method for forming the color filter 57 is the same with the method of prior art. The color of color filter depends on the color of corresponding sub-pixel. A common electrode 58 is formed on the color filter 57. Finally, the two transparent substrates are sealed with the color filters 52, 57 face to face and vacuumed, and liquid crystal is injected into the space between the two transparent substrates to form the liquid crystal layer 59.

The light rays in the reflective area 311 pass through the color filter 57 twice and the light rays in the transmissive area 312 pass through the color filter 52 and the color filter 57. Therefore, we can adjust the thickness t3 of color filter 52 and the thickness t4 of color filter 57 to generate the similar or same color saturation in the reflective area and the transmissive area while the transflective-type color LCD uses both of the transmissive and reflective display modes at the same time.

Although the specific embodiment has been illustrated and described, it will be obvious to those skilled in the art that various modifications may be made without departing from what is intended to be limited solely by the appended claims.

What is claimed is:

1. A liquid crystal display device, comprising:
    a first substrate having a reflective area and a transmissive area, and a plurality of thin film transistors (TFTs) thereon;
    a dielectric layer on said first substrate;
    a first color filter on said dielectric layer;
    an elevated dielectric layer on said first color filter in said reflective area;
    a first electrode on said elevated dielectric layer in said reflective area and on said first color filter in said transmissive area, wherein the top surface of said first electrode in said reflective area is higher than the top surface of said first electrode in said transmissive area;
    a liquid crystal layer on said first electrode;
    a second electrode on said liquid crystal layer;
    a second color filter on said second electrode; and
    a second substrate on said second color filter.

2. The liquid crystal display device according to claim 1, wherein said first and second substrates are transparent.

3. The liquid crystal display device according to claim 1, wherein the material of said dielectric layer is selected from the group consisting of SiO$_2$, Si$_3$N$_4$ and both.

4. The liquid crystal display device according to claim 1, the material of said elevated dielectric layer is photopolymer.

5. The liquid crystal display device according to claim 4, wherein the thickness of said elevated dielectric layer is about 1~3 μm.

6. The liquid crystal display device according to claim 1, wherein said first and second color filters comprise three non-overlapping color areas.

7. The liquid crystal display device according to claim 6, wherein said three color areas are red, green and blue.

8. The liquid crystal display device according to claim 7, wherein the colors of identical areas on said first and second color filters are same.

9. The liquid crystal display device according to claim 1, wherein said first electrode is coated by using the sputter method.

10. The liquid crystal display device according to claim 1, wherein the height of said first electrode on said elevated dielectric layer is higher than the height of said first electrode on said first color filter in the transmissive areas.

11. The liquid crystal display device according to claim 9, wherein said first electrode is electrically connected with said plurality of TFTs.

12. The liquid crystal display device according to claim 9, wherein the material of said first electrode on said elevated dielectric layer is selected from the group consisting of Al, Ag and AlNd alloy.

13. The liquid crystal display device according to claim 9, wherein the material of said first electrode on said first color filter in the transmissive areas is selected from the group consisting of ITO (indium tin oxide) and IZO (indium zinc oxide).

14. The liquid crystal display device according to claim 1, wherein the best performance in the transmissive and reflective areas can be made by adjusting the thicknesses of two color filters on the lower and upper transparent substrates.

15. The liquid crystal display device according to claim 14, wherein the best performance in the transmissive and reflective areas is the best performance of color saturation in the transmissive and reflective areas.

16. A liquid crystal display device, comprising:
    a first substrate having a reflective area and a transmissive area, and a plurality of thin film transistors (TFTs) thereon;
    a dielectric layer on said first substrate;
    a first color filter on said dielectric layer in said transmissive area;
    an elevated dielectric layer on said dielectric layer in said reflective area;
    a reflective electrode on said elevated dielectric layer;
    a transmissive electrode on said first color filter, wherein the top surface of said reflective electrode is higher than the top surface of said transmissive electrode;
    a liquid crystal layer on said reflective electrode and on said transmissive electrode;
    a common electrode on said liquid crystal layer;
    a second color filter on said common electrode; and
    a second substrate on said second color filter.

17. The liquid crystal display device according to claim 16, wherein said first and second substrates are transparent.

18. The liquid crystal display device according to claim 16, wherein the material of said dielectric layer is selected from the group consisting of SiO$_2$, Si$_3$N$_4$ and both.

19. The liquid crystal display device according to claim 16, the material of said elevated dielectric layer is photopolymer.

20. The liquid crystal device according to claim 19, wherein the thickness of said elevated dielectric layer is about 1~3 μm.

21. The liquid crystal display device according to claim 16, wherein said first and second color filters comprise three non-overlapping color areas.

22. The liquid crystal display device according to claim 21, wherein said three color areas are red, green and blue.

23. The liquid crystal device according to claim 22, wherein the colors of identical areas on said first and second color filters are same.

24. The liquid crystal display device according to claim 16, wherein said reflective electrode is coated y suing the sputter method.

25. The liquid crystal display device according to claim 24, wherein the material of said reflective electrode on said elevated dielectric layer is selected from the group consisting of Al, Ag and AlNd alloy.

26. The liquid crystal display device according to claim 16, wherein said transmissive electrode is coated by using the sputter method.

27. The liquid crystal display device according to claim 26, wherein the material of said transmissive electrode on said first color filter in the transmissive areas is selected from the group consisting of ITO (indium tin oxide) and IZO (indium zinc oxide).

28. The liquid crystal display device according to claim 16, wherein said transmissive electrode is electrically connected with said reflective electrode.

29. The liquid crystal display device according to claim 16, wherein said transmissive electrode is electrically connected with said plurality of TFTs.

30. The liquid crystal display device according to claim 16, wherein said reflective electrode is electrically connected with said plurality of TFTs.

31. The liquid crystal display device according to claim 16, wherein the best performance in the transmissive and reflective areas can be made by adjusting the thicknesses of two color filters on the lower and upper transparent substrates.

32. The liquid crystal display device according to claim 31, wherein the best performance in the transmissive and reflective areas is the best performance of color saturation in the transmissive and reflective areas.

33. A liquid crystal display device, comprising:
a first substrate having a reflective area and a transmissive area;
a first color filter on said first substrate in said transmissive area;
an elevated dielectric layer on said first substrate in said reflective area;
a liquid crystal layer on said elevated dielectric layer in said reflective area and on said first color filter in said transmissive area; wherein the height of said liquid crystal layer in said reflective area is smaller than the height of said liquid crystal layer in said transmissive area;
a second color filter on said liquid crystal layer; and
a second substrate on said second color filter.

34. The liquid crystal display device according to claim 33, wherein said first and second substrates are transparent.

35. The liquid crystal display device according to claim 33, the material of said elevated dielectric layer is photopolymer.

36. The liquid crystal display device according to claim 35, wherein the thickness of said elevated dielectric layer is about 1~3 $\mu$m.

37. The liquid crystal display device according to claim 33, wherein said first and second color filters comprise three non-overlapping color areas.

38. The liquid crystal display device according to claim 37, wherein said three color areas are red, green and blue.

39. The liquid crystal display device according to claim 38, wherein the colors of identical areas on said first and second color filters are same.

40. The liquid crystal display device according to claim 33, wherein the best performance in the transmissive and reflective areas can be made by adjusting the thickness of two color filters on the lower and upper transparent substrates.

41. The liquid crystal display device according to claim 40, wherein the best performance in the transmissive and reflective areas is the best performance of color saturation in the transmissive and reflective areas.

* * * * *